United States Patent Office 3,408,399
Patented Oct. 29, 1968

3,408,399
6,7-DIHYDRO-5H-BENZOCYCLOHEPTEN-5-ONES AND PROCESS OF PREPARING SAME
Eugene E. Galantay, Morristown, N.J., assignor to Sandoz Inc., Hanover, N.J.
No Drawing. Filed June 23, 1966, Ser. No. 559,753
6 Claims. (Cl. 260—590)

This invention relates to bicyclic compounds. In particular, the invention pertains to benzocycloheptenones, improved processes for preparing the same and intermediates utilized in said processes.

The benzocycloheptenones to which the present invention relates are of the formula:

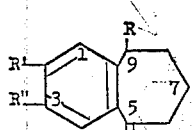

I wherein

R represents phenyl or p-chlorophenyl; and
R' and R" each independently represent hydrogen or lower alkoxy, preferably containing from 1 to 4 carbon atoms, e.g., methoxy, ethoxy, propoxy and butoxy.

The compound of Formula I wherein R is phenyl and R' and R" are both hydrogen is old and may be prepared in the manner described by L. H. Klemm and G. M. Bower in the J. Org. Chem., 23, 344 (1958). The other compounds represented by Formula I may likewise be prepared in the manner described in the above publication. However, the process described therein involves a multi-step synthesis which includes a "high dilution cyclization" step, and is therefore commercially impractical from the standpoint of the time involved and the yields obtained.

It has now been discovered that the above compounds may be prepared conveniently and in an economical manner by a one-step process which involves the reaction of benzene or an appropriately substituted derivative thereof with a δ-hydroxy-valeric acid (or corresponding lactone or γ,δ-unsaturated acid). This process may be illustrated as follows:

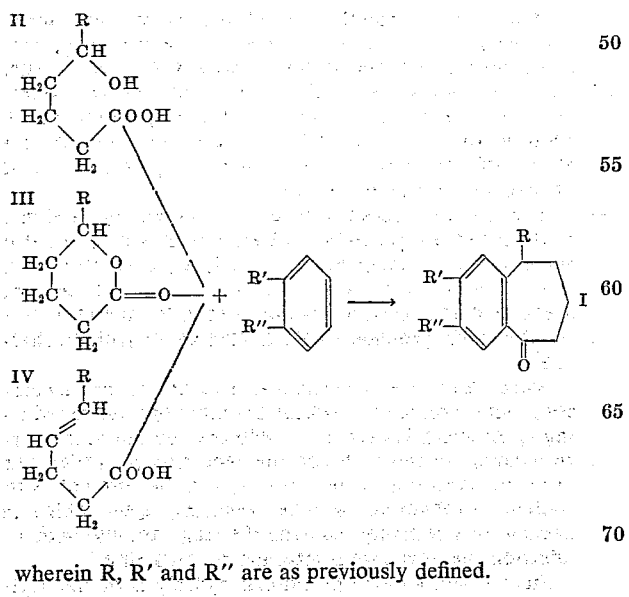

wherein R, R' and R" are as previously defined.

The reaction of benzene (or appropriate derivative thereof) with either of the compounds represented by Formulas II, III or IV is carried out in the presence of an acid dehydrating agent and at room temperature (20–25° C.) or elevated temperatures of up to about 150° C. Suitable acid dehydrating agents include polyphosphoric acid, esters of polyphosphoric acid, liquid hydrogen fluoride and such other agents as are commonly employed in Friedel-Crafts reactions. However, the preferred acid dehydrating agent is polyphosphoric acid. If desired, the reaction may be carried out in any suitable inert organic solvent. However, the use of a solvent is generally not necessary where the dehydrating agent or either of the reactants is a liquid at the temperature at which the reaction is carried out since an excess of such dehydrating agent or reactant can be used for this purpose. The resulting benzocyclohepten-5-one (I) is readily recovered in conventional manner.

Alternatively, the compounds of Formula I may be prepared by reacting benzene (or an appropriate derivative thereof) with a γ-benzoyl butyric acid or its corresponding lactone to form the corresponding compounds of Formula I which are unsaturated at the 8,9-position and then hydrogenating the latter compounds. Although this process involves two steps as contrasted with the one-step process described above, it is still a much more practical and economical process in comparison with either the multi-step process referred to hereinabove or the multi-step process described by S. Julia and Y. Bonnet in Bull. Soc. Chim. France, 1340–1353 (1957) for preparing the compounds 6,7-dihydro-5H-benzocyclophepten-5-one and 6,7,8,9-tetrahydro-5H-benzocyclohepten-5-one. This alternative process may be represented as follows:

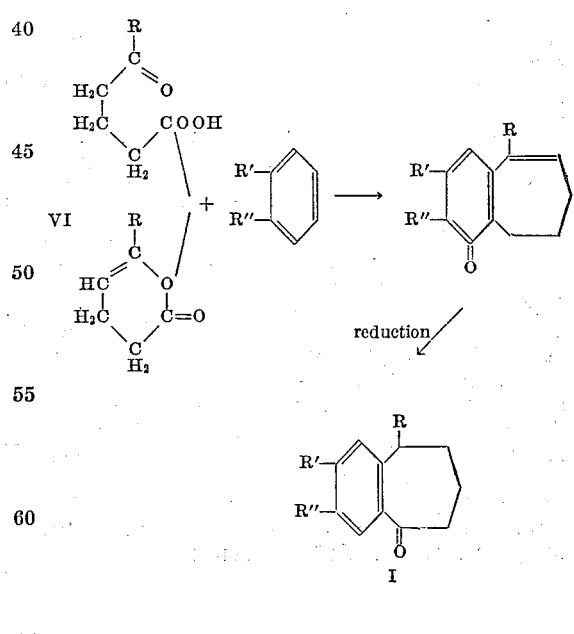

Wherein R, R' and R" are as previously defined.

The reaction of benzene (or appropriate derivative thereof) with either of the compounds represented by Formulas V and VI to form the 6,7-dihydro-5H-benzocyclohepten-5-ones of Formula VII is effected in the same manner as set forth hereinabove for the one-step process for preparing the 6,7,8,9-tetrahydro-5H-benzocyclohepten-5-ones of Formula I. The reduction of the 6,7-dihydro-5H-benzocyclohepten-5-ones (VII) to the corresponding saturated ketones (I) is effected by conventional hydrogenation, preferably catalytically employing a suitable catalyst, such as, for example, platinic oxide, palladium-charcoal, Raney nickel and the like.

The starting compounds II, III, IV, V and VI as well as the benzene derivatives employed in the above processes are either known and can be prepared as described in the litreature if not specifically known, can be prepared from available materials in analogous manner.

The compounds of Formula I are useful as intermediates for the preparation of 6-amino-6,7,8,9-tetrahydro-5H-benzocyclohepten-5-ols of the formula

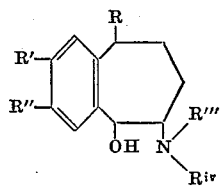

VIII

Wherein R, R' and R" have the same significance as previously indicated with respect to Formula I hereinabove and R''' and R$^{iv}$ each represent hydrogen or lower alkyl. Compounds of Formula VIII in turn possess anorexigenic activity and can be utilized either therapeutically for the treatment fo existing obesity or prophylactically whenever a predisposition to obesity exists or where, for other reasons, it is desired to reduce caloric intake. For such usage, satisfactory results are obtained when the compounds are administered either orally or parenterally in any of the conventional pharmaceutical forms, e.g., tablets, capsules, injectable solutions and the like, and at a daily dosage of from about 10 milligrams to about 150 milligrams, preferably given in divided doses of from about 2.5 milligrams to about 75 milligrams, two to four times a day or in sustained release form.

The compounds of Formula VIII are prepared by nitrosation of the corresponding 6,7,8,9-tetrahydro-5H-benzocyclohepten-5-one of Formula I to form the corresponding 6 - isonitroso-6,7,8,9-tetrahydro-5H-benzocyclohepten-5-one and then reducing the latter in a solvent system which also serves as an acylating medium to form the corresponding 6-acylamino - 6,7,8,9-tetrahydro-5H-benzocyclohepten-5-one. The latter is then converted to the corresponding compound of Formula VIII, wherein R''' and R$^{iv}$ are both hydrogen, by either (1) hydrolyzing the 6-acylamino-6,7,8,9 - tetrahydro - 5H - benzocyclohepten-5-one to form the corresponding 6-amino-6,7,8,9-tetrahydro-5H-benzocyclohepten-5-one (as a salt) and then reducing the latter or (2) first reducing said 6-acylamino-6,7,8,9-tetrahydro - 5H - benzocyclohepten-5-one to form the corresponding 6 - acylamino - 6,7,8,9 - tetrahydro-5H-benzocyclohepten-5-ol and then hydrolyzing the latter. The compounds of Formula VIII wherein

is alkylamino or dialkylamino are prepared from the thus-obtained 6-amino-6,7,8,9-tetrahydro-5H-benzocyclo-hepten-5-ol by alkylation. The over-all process is illustrated below:

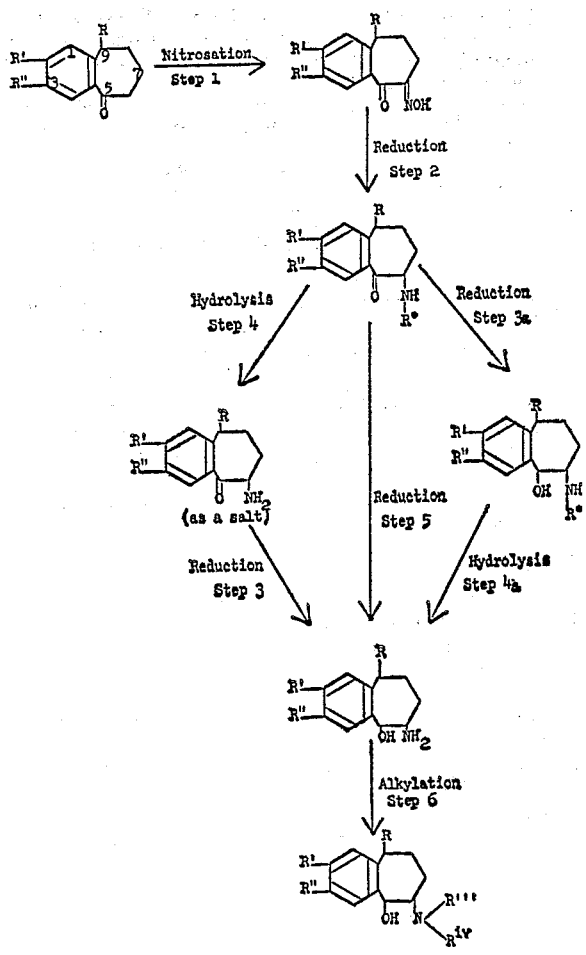

In the above reaction scheme, R, R', R", R''' and R$^{iv}$ are as previously defined and R° represents acyl, preferably lower alkanoyl.

The general conditions for carrying out the above process are as follows:

Step 1.—Conveniently effected in conventional manner employing an appropriate inert organic solvent, e.g., benzene, toluene and diethyl ether, and a lower alkyl nitrite, e.g., ethyl nitrite, butyl nitrite and amyl nitrite. Preferably, the reaction is carried out at a temperature below room temperature, e.g., 0–5° C. and in the presence of a strong anhydrous acid or base, such as, hydrochloric acid or sodium methoxide, respectively.

Step 2.—Conventional reduction, preferably catalytic, of the isonitroso group in a solvent system which can also serve as an acylating medium, such as, a mixture of a lower alkanoic acid and its corresponding anhydride, e.g., acetic acid and acetic anhydride, and in the presence of a suitable hydrogenation catalyst, such as, palladium/charcoal.

Steps 3 and 3a.—Conventional reduction of the ring carbonyl with sodium borohydride or other appropriate reducing agent which is capable of reducing ketones to the corresponding alcohols. Where the reduction is carried out prior to hydrolysis (Step 3a), it can be effected with sodium borohydride or other reducing agent which is capable of selectively reducing the ring carbonyl without affecting the acyl group attached to such ring.

Steps 4 and 4a.—Conventional hydrolysis of the acylamino group in acidic medium, e.g., aqueous hydrochloric acid and aqueous hydrobromic acid.

Step 5.—Alternate procedure for preparing the 6-amino-6,7,8,9 - tetrahydro-5H-benzocyclohepten-5-ols directly from the corresponding 6-acylamino-6,7,8,9-tetrahydro-5H-benzocyclohepten-5-ones by conventional reduction with lithium aluminum hydride or other appropriate reducing agent which is capable of simultaneously reducing both the ring carbonyl and acyl group.

Step 6.—Conventional alkylation of the 6-amino-6,7,8,9-tetrahydro - 5H-benzocyclohepten - 5 - ol. Compounds which are substituted at the 6-position with either an alkylamino or a dialkylamino group having the same alkyl substituents are conveniently prepared employing the required stoichiometric amount of the appropriate alkylating agent. Those compounds which are substituted at the 6-position with dimethylamino are readily prepared by the Eschweiler-Clarke Modification. For those compounds having a dialkylamino group containing different alkyl groups, alkylation is effected in two steps each of which employs the appropriate alkylating agent.

The invention is further illustrated by the following representative examples. However, it is to be understood that the examples are for illustration only and are not intended as in any way limiting the scope of the invention which is defined in the appended claims.

EXAMPLE 1.—2,3-DIMETHOXY-9-PHENYL-6,7,8,9-TETRAHYDRO-5H-BENZOCYCLOHEPTEN-5-ONE

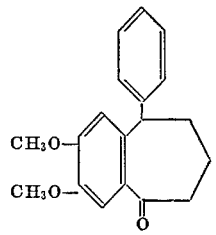

To 1200 g. of polyphosphoric acid stirred at 55° C. is added a mixture of 158.2 g. of veratrole and 220 g. of crude δ-phenyl-δ-hydroxyvaleric acid (obtained by reduction of γ-benzoyl-butyric acid with sodium borohydride and containing some of the corresponding lactone) over a period of 15 minutes while maintaining the temperature of the reaction between 60–62° C. After the addition is completed the mixture is maintained at 60° C. for 2 hours, then poured over ice and the resulting mixture vigorously stirred and then extracted with benzene. The benzene extract is then washed with cold 2 N aqueous sodium hydroxide, dried over sodium sulfate and the benzene evaporated. The resulting oil is vacuum distilled to yield 2,3-dimethoxy - 9 - phenyl-6,7,8,9-tetrahydro-5H-benzocyclohepten-5-one, M.P. 81–83° C., B.P. 220° C./20 mm. The same product is obtained if instead of using δ-phenyl-δ-hydroxyvaleric acid the corresponding lactone is employed.

EXAMPLE 2.—2,3-DIMETHOXY-9-P-CHLOROPHENYL - 6,7,8,9 - TETRAHYDRO - 5H - BENZOCYCLOHEPTEN-5-ONE

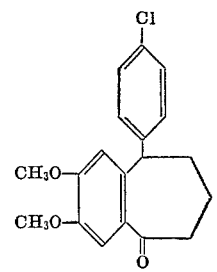

Procedure A

A mixture of 500 mg. of δ-p-chlorophenyl-δ-hydroxyvaleric acid, 300 mg. of veratrole and 8.0 kg. of polyphosphoric acid is stirred at 60° C. for 1 hour and then poured over ice and stirred vigorously and then extracted with benzene. The benzene extract is then washed with cold 2 N aqueous sodium hydroxide, dried over sodium sulfate and the benzene evaporated. The resulting material is vacuum distilled to yield 2,3-dimethoxy-9-p-chlorophenyl - 6,7,8,9 - tetrahydro-5H-benzocyclohepten-5-one. Recrystallization from ethyl acetate affords material, M.P. 113–114° C.

Procedure B

Step A.—A mixture of 282 g. of γ-(p-chlorobenzoyl) butyric acid, 201.9 g. of veratrole and 3700 g. of polyphosphoric acid is stirred at 60–70° C. for 40 minutes and then poured over ice. The resulting precipitate is washed first with diethyl ether, then with 2 N aqueous sodium carbonate solution and then with water and dried to obtain 2,3 - dimethoxy-9-p-chlorophenyl-6,7-dihydro-5H-benzocyclohepten-5-one, M.P. 145–159° C. Recrystallization from benzene followed by vacuum sublimation yields purified material, M.P. 158–160° C.

Step B.—A solution of 250 mg. of 2,3-dimethoxy-9-p-chlorophenyl - 6,7-dihydro-5H-benzocyclohepten-5-one in 10 ml. of 1,2-dimethoxy-ethane is stirred with prereduced platinum dioxide in a hydrogen atmosphere until the calculated amount of hydrogen is consumed. The solution is filtered to remove the catalyst and the filtrate evaporated to yield 2,3-dimethoxy-9-p-chlorophenyl-6,7,8,9-tetrahydro-5H-benzocyclohepten-5-one.

What is claimed is:

1. A compound of the formula

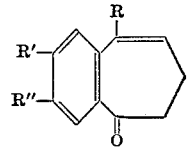

wherein

R represents phenyl or p-chlorophenyl, and
R' and R" each independently represent hydrogen or lower alkoxy.

2. The compound of claim 1 which is 2,3-dimethoxy-9-p-chlorophenyl-6,7-dihydro-5H-benzocyclohepten-5-one.

3. A process for preparing a compound of the formula

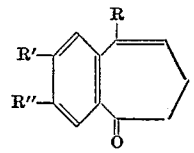

wherein

R represents phenyl or p-chlorophenyl, and
R' and R" each independently represent hydrogen or lower alkoxy.

which comprises reacting a compound selected from the group consisting of a γ-aroyl-butyric acid and its corresponding lactone, wherein aroyl represents benzoyl or p-chlorobenzoyl, with a compound of the formula

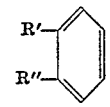

wherein R' and R" are as defined, in the presence of an acid dehydrating agent selected from the group consisting of polyphosphoric acid and esters thereof.

4. A process of claim 3 where the acid dehydrating agent is polyphosphoric acid.

5. A process of claim 3 wherein R' and R" are the same and represent methoxy or ethoxy.

6. A process of claim 5 where the acid dehydrating agent is polyphosphoric acid.

References Cited

FOREIGN PATENTS 485,309   11/1929   Germany.
392,548   10/1965   Switzerland.

OTHER REFERENCES

Mosby, J. Am. Chem. Soc. 74 2564–2569 (1952).
Granger et al., Compt. Rend. 252, 1478–1480 (1961).
Klemm et al., J. Org. Chem. 23, 344–348 (1958).

DANIEL D. HORWITZ, *Primary Examiner.*